United States Patent [19]
Lortz

[11] 3,760,714
[45] Sept. 25, 1973

[54] BLANCHING APPARATUS

[76] Inventor: Don C. Lortz, Box 1258, Idaho Falls, Idaho

[22] Filed: Dec. 29, 1971

[21] Appl. No.: 213,679

[52] U.S. Cl. .................................. 99/404, 165/72
[51] Int. Cl. ............................................. A23n 9/00
[58] Field of Search ...................... 99/404, 405, 407, 99/408, 409, 443 C, 443 R, 447, 450, 403, 477, 467, 324; 165/72, 104, 156, 155, 154; 259/9, 10, DIG. 18

[56] References Cited
UNITED STATES PATENTS

| | | | |
|---|---|---|---|
| 3,086,444 | 4/1963 | deBack | 99/404 |
| 3,433,150 | 3/1969 | Fries | 99/403 |
| 690,005 | 12/1901 | Anderson et al. | 99/443 C |
| 2,182,735 | 12/1939 | O'Dowd | 99/403 |

FOREIGN PATENTS OR APPLICATIONS

| | | | |
|---|---|---|---|
| 720,710 | 5/1942 | Germany | 99/404 |
| 165,925 | 11/1955 | Australia | 99/443 R |

Primary Examiner—Leon G. Machlin
Attorney—Frank P. Cyr

[57] ABSTRACT

A blanching apparatus comprising a perforate screw conveyor mounted for rotation within a liquid filled shell having mounted on its outer surfaces a plurality of thermally insulated steam conducting passages for indirectly heating the liquid within the shell. In one instance, a perforate screw conveyor extends within one end of the shell for the discharge of materials from within the shell and in another modification of the invention, a rotaty Ferris wheel-type arrangement is provided at the discharge end of the shell for the removal of materials from within the same. Access to the interior of the shell and to the discharge means aforesaid is provided by means of hinged sections or panels extending thereover.

3 Claims, 9 Drawing Figures

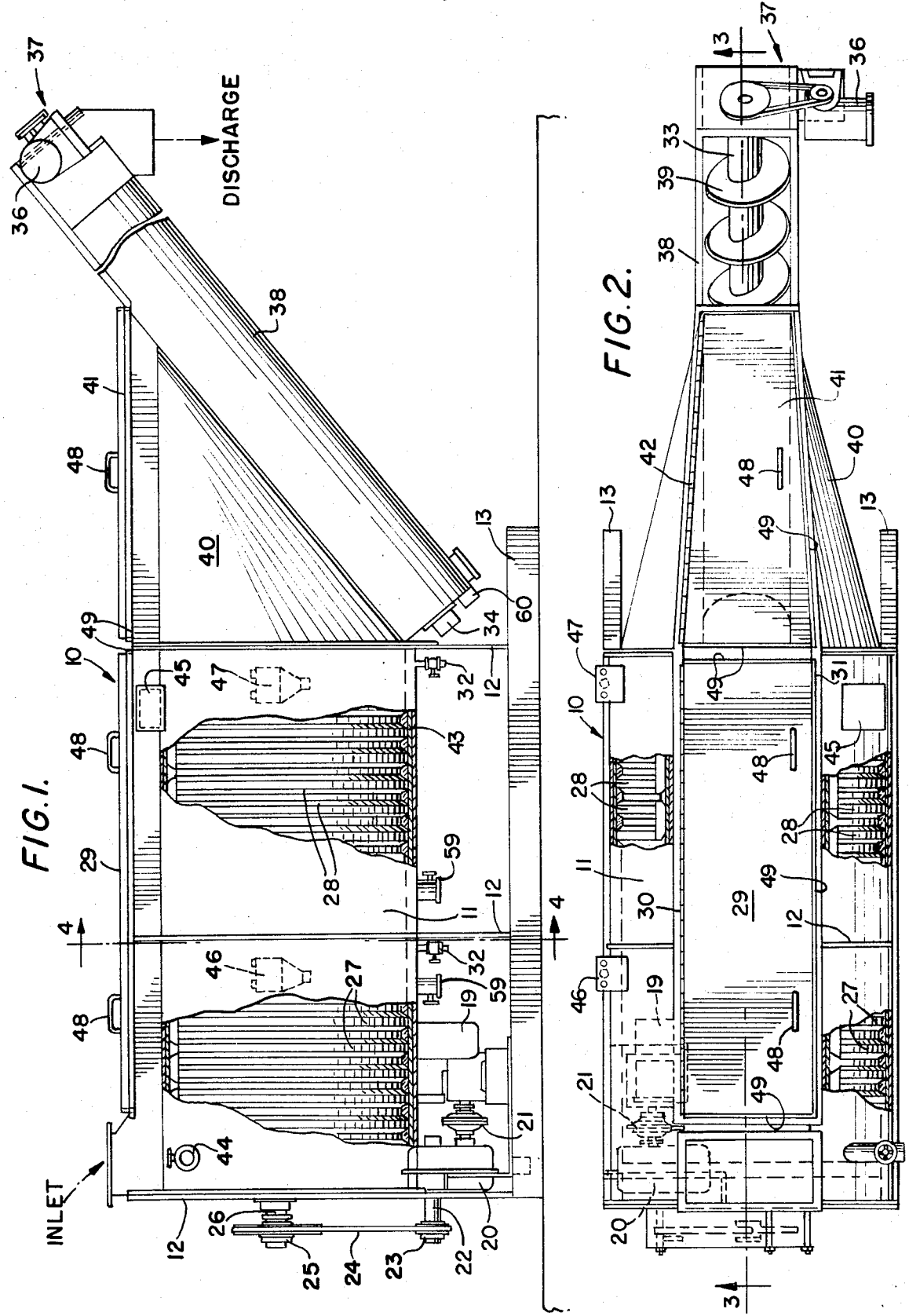

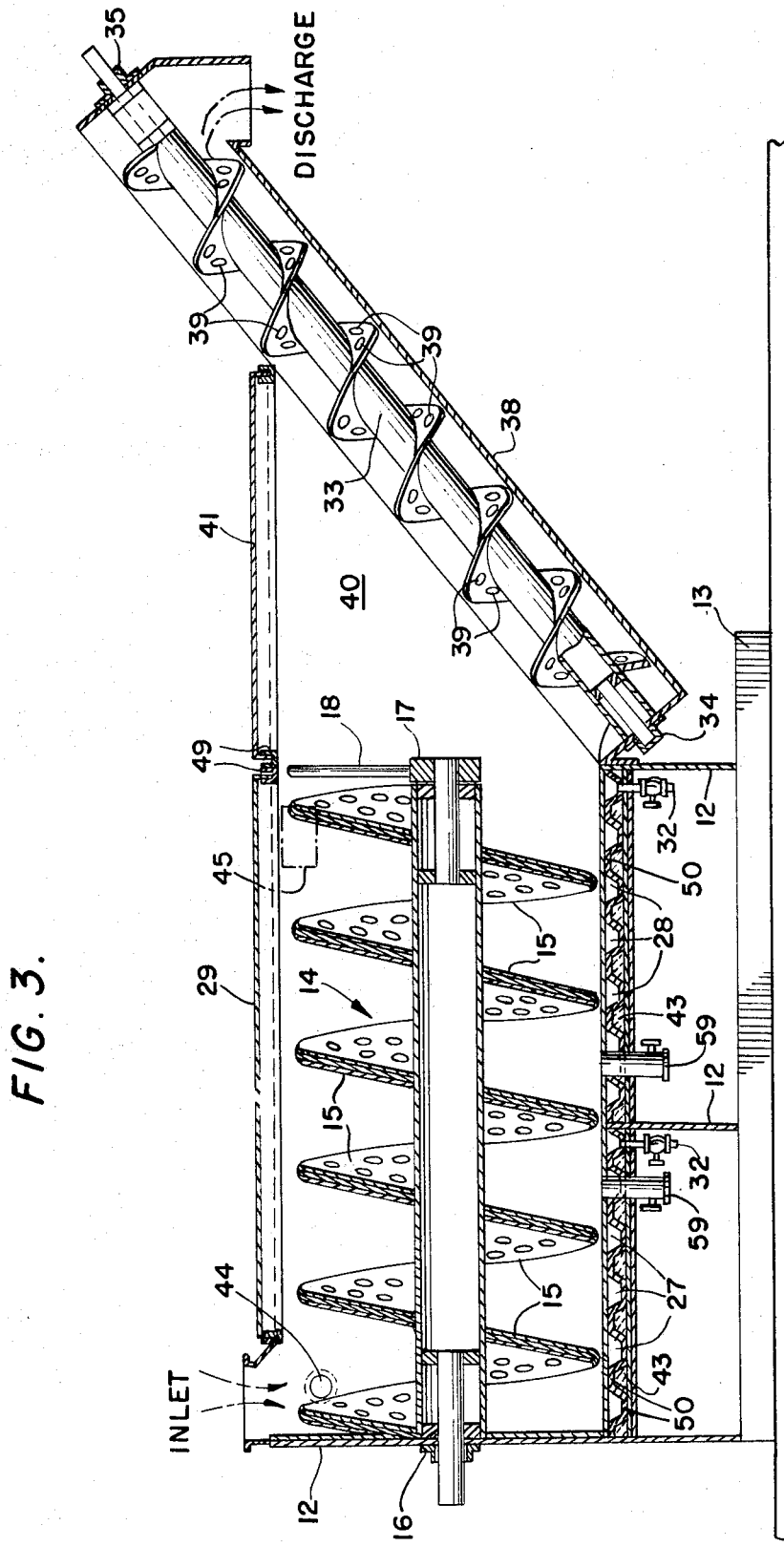

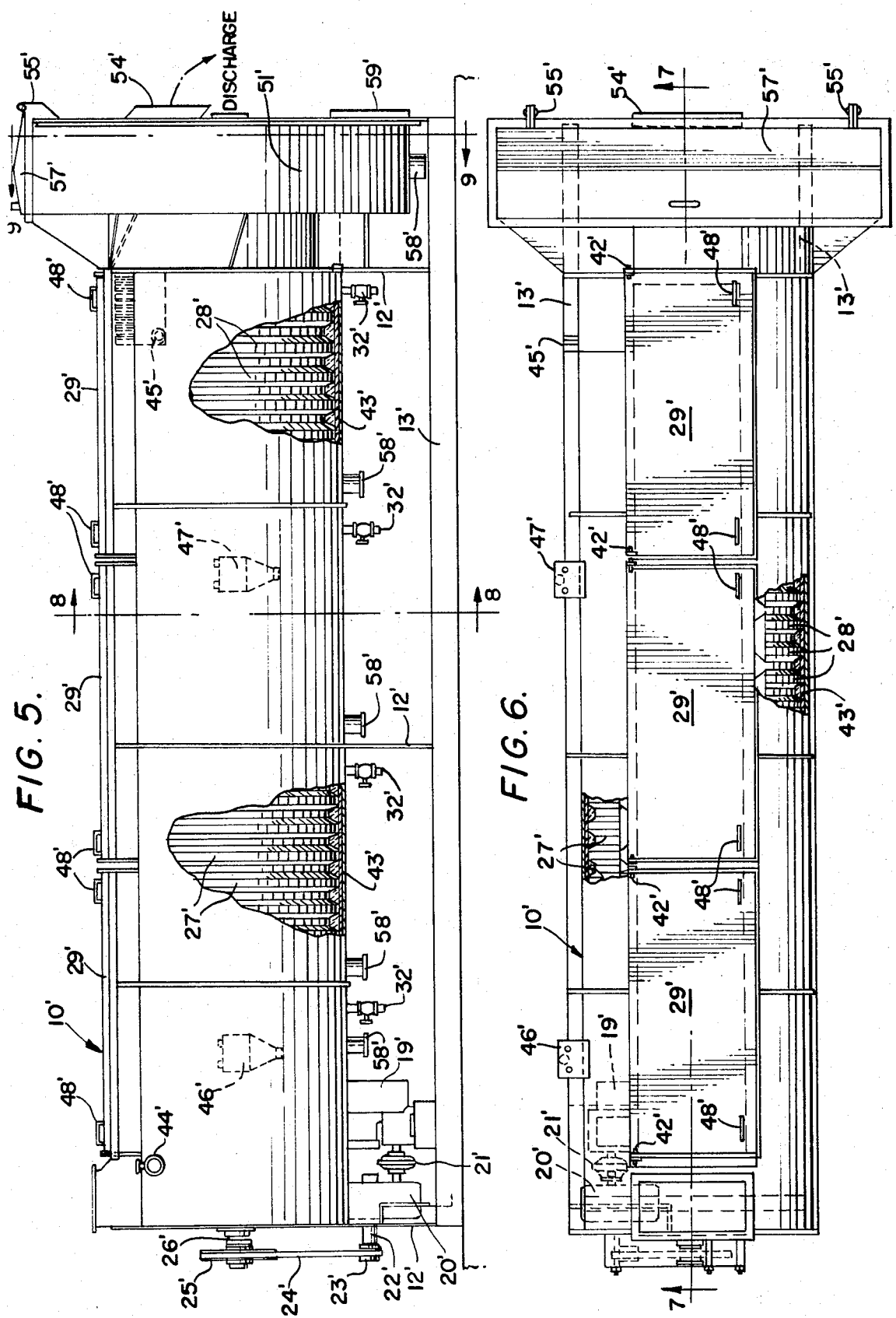

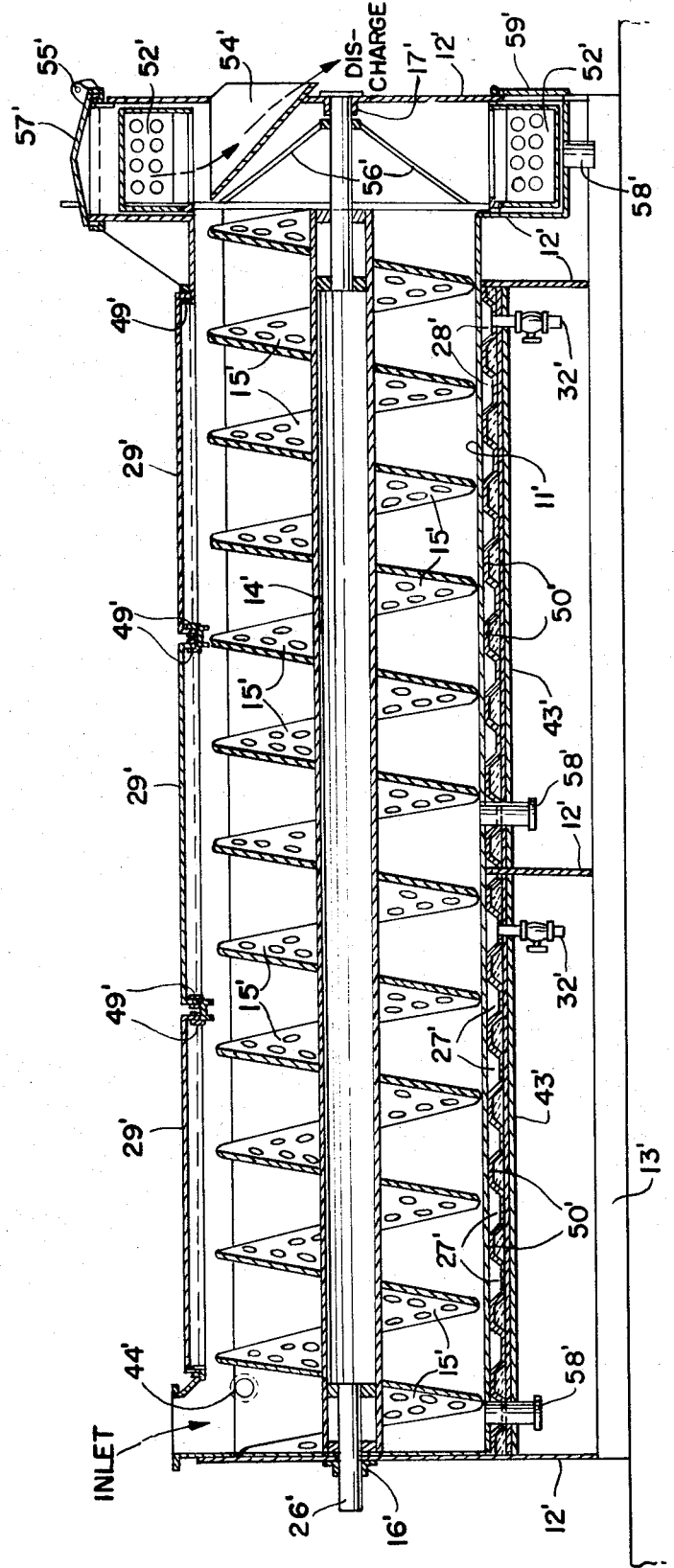

BLANCHING APPARATUS

BACKGROUND OF THE INVENTION

Blanching apparatus are commonly employed in the treatment of various vegetables such as potatoes and the like and usually the blanching operation is carried out by subjecting the vegetables to the action of a heated liquid such as water. A blanching apparatus may comprise a stationary shell of appropriate size within which is mounted a rotary conveyor mechanism such as a screw conveyor which serves to move the vegetables undergoing blanching from the inlet end of the shell to the discharge end thereof. At the discharge end of the shell some appropriate means is provided for the discharge of the now processed vegetables and to deliver the same to a suitable receiver means. Ordinarily, the water or other liquid employed in the blanching operation is heated by the introduction thereinto of a live steam which serves to maintain the liquid at the desired degree temperature to effect the blanching of the vegetables as they travel from the entrance to the exit end of the apparatus. Under ordinary circumstances, live steam is supposedly capable of destroying various bacteria in a liquid such as water but quite frequently, various chemicals are added to the water prior to converting the same to steam. Such chemicals may be water softeners, etc. Obviously, when such chemically treated water is converted into steam, these chemicals are still present in the steam and the treatment of the water or other liquid within the blanching apparatus, aforesaid, with such a steam may have deleterious effects on the vegetables undergoing a blanching operation.

In recent years, considerable concern has been expressed by various governmental agencies regarding the equipment employed in the processing of various fruits and vegetables, including blanching equipment. Some guidelines have already been promulgated by the Federal Government. The Code of Federal Regulations, Title 21, recites some of the requirements for apparatus employed in the processing of certain foods, including vegetables. One of the main objections to the currently employed processing equipment is that the same does not lend itself for the easy and periodic cleaning thereof and also that in numerous instances, the metals employed in the formation of such equipment is conducive to the formation of rust and such rust will adversely affect the material undergoing treatment in such equipment.

With the above in mind, it is the primary object of the invention to construct a blanching apparatus which will insure the hygenic treatment therein of vegetables such as potatoes and the like.

Another object of the invention is to so construct a blanching apparatus which will permit easy access therein for the periodic cleaning of the interior of the shell of the blancher and moving parts therein to insure the sanitary condition of the equipment.

Another object of the invention is to provide a means for indirectly heating the water or other liquid employed for the blanching operation. This will avoid the contamination of the aforesaid liquid which could occur if a live steam is injected therein.

Another object of the invention is to provide a number of temperature sensing devices and positioning the same at various strategic locations along the outside of the shell of the blancher to thus enable the operator of the blancher to readily observe the degree temperature of the liquid employed for the blanching operation. Such temperature sensing devices will permit for the regulation of the steam directed into the plurality of banks of steam admission conduits which are mounted on the exterior wall of the said shell.

Another object of the invention is to weld or otherwise secure a plurality of banks of steam conduits to the exterior wall of the casing of the blancher and to encase the conduits within a suitable insulation medium to minimize heat losses.

A still further object of the invention is to weld or otherwise secure a plurality of substantially U-shaped trough members directly onto the outside wall of the shell of the blancher so that the steam admitted into the formed passageways will be in direct contact with the outside wall of the shell to thus improve the heat transfer from the steam to the liquid within the shell.

A still further object of the invention is to provide an automatic means, responsive to the liquid level within the shell of the blancher, to add water or other processing liquid to the shell to maintain the desired liquid level therein.

Another object of the invention is to provide a suitable overflow mechanism at the discharge end of the blancher to permit for the automatic removal of any excess water or other blanching liquid from within the shell of the blanching apparatus.

Further objects of the invention will appear from the following description in which the preferred embodiments have been set forth in detail in conjunction with the accompanying drawings.

DESCRIPTION OF THE DRAWINGS

FIG. 1 is a side elevation of one form of the blancher, shown with parts broken away.

FIG. 2 is a top plan view of the blancher shown in FIG. 1, with parts broken away.

FIG. 3 is a section taken on line 3—3 of FIG. 2 looking in the direction of the arrows and omitting certain parts to more clearly show the relationship of the main screw and discharge screw arrangement.

FIG. 5 is a side elevational view, with parts broken away, of a modified type of blancher mechanism.

FIG. 6 is a top plan view of the blancher shown in FIG. 5, with parts broken away.

FIG. 7 is a section taken on line 7—7 of FIG. 6, looking in the direction of the arrows and omitting certain parts to more clearly show the relationship of the main screw and paddle wheel discharge arrangement.

DESCRIPTION OF THE PREFERRED EMBODIMENTS

Figure 4:
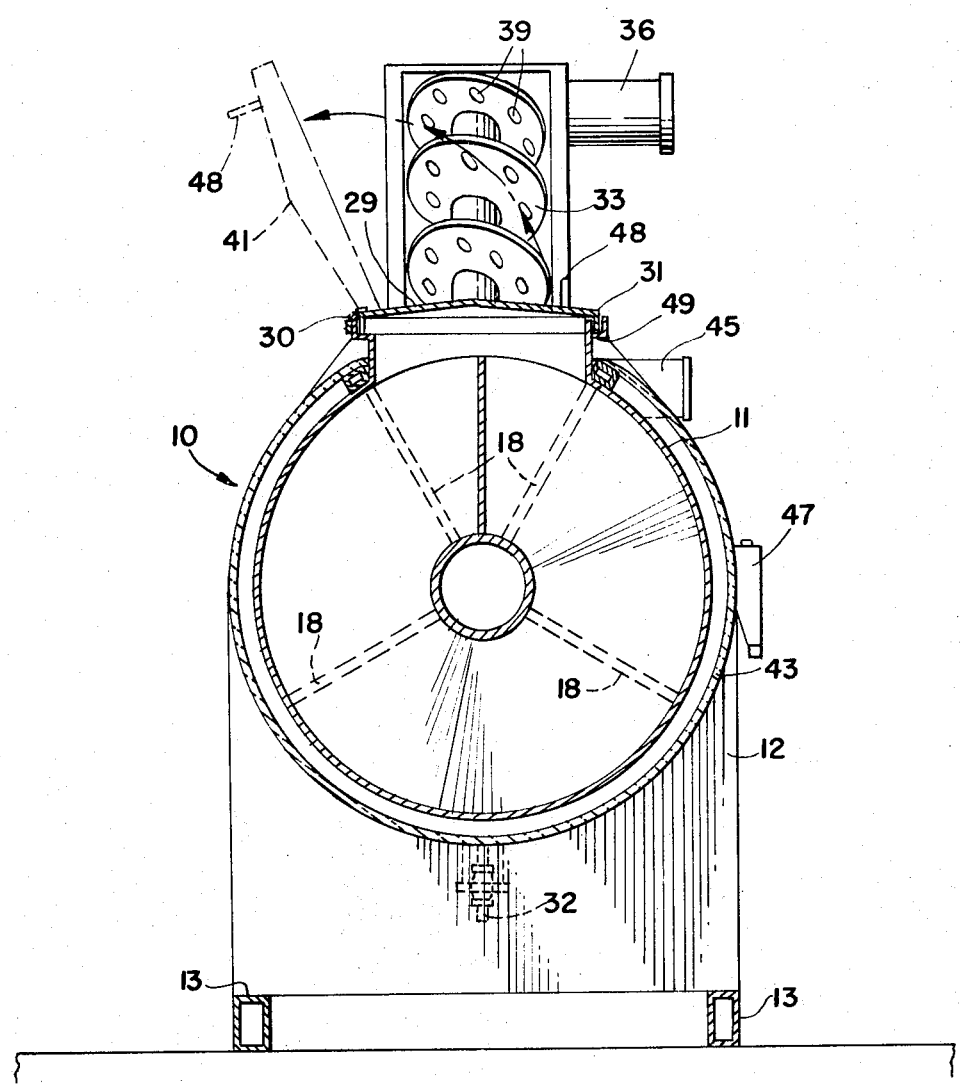
FIG. 4 is a section taken on line 4—4 of FIG. 1, looking in the direction of the arrows.
Figure 8:
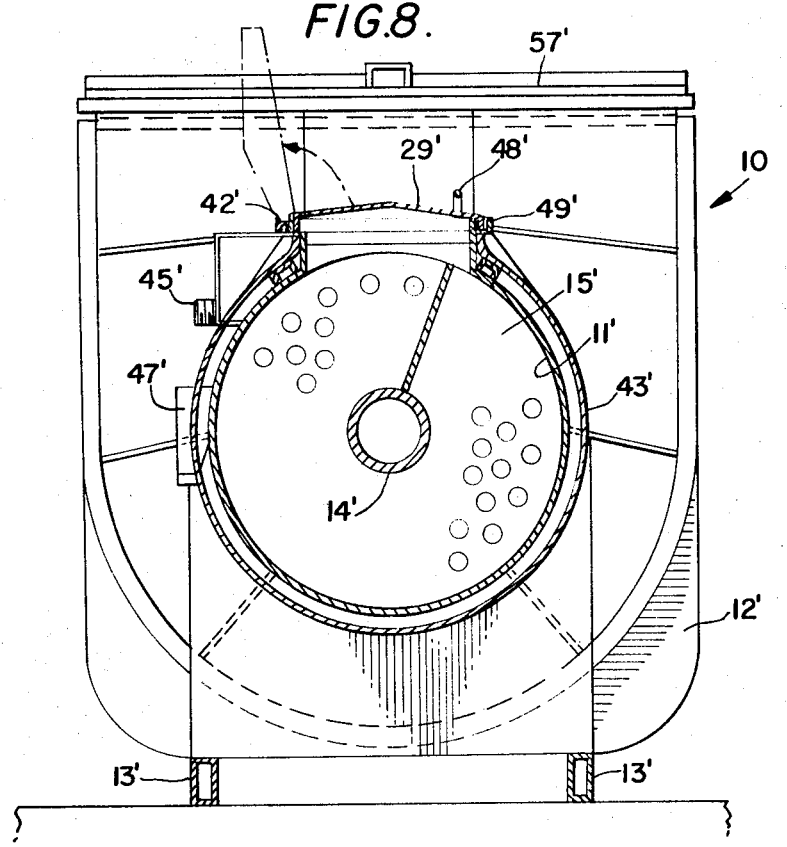
FIG. 8 is a section taken on line 8—8 of FIG. 5, looking in the direction of the arrows.

Referring now to the drawings wherein like numerals are employed to designate like parts, there is shown at FIGS. 1 to 4, inclusive, a blancher indicated generally by the reference numeral 10. The following description of the apparatus of the present invention will be described as a blancher particularly suited for the blanching of potatoes although it will be obvious that the apparatus can be as effectively employed for the blanching of other vegetables. For that matter, the apparatus of the present invention can be effectively employed in any instance where a substance is to be treated within a shell containing a heated liquid therein.

The blancher 10 comprises a cylindrical shell 11 of suitable dimensions and is mounted on plate like standards 12 which retain the shell and parts mounted thereon in an elevated position with respect to a base 13 constructed of any suitable framework. The manner of mounting the shell 11 in the manner aforesaid is shown more clearly in FIGS. 3 and 4 of the drawings.

The shell 11 houses the water or other liquid employed for the blanching operation and in order to offset the formation of any rust therein, the same is preferably made of stainless steel throughout its entire area. Of course, other metals could be employed to form the shell, aforesaid, the only requirement being that the same be non-corrosive. It is conceivable that the shell could be formed of a suitable plastic material. However, such plastic material should be such that no deleterious effects could be derived therefrom which could adversely affect the liquid employed for the blanching operation.

Mounted for rotation within the shell 11 is a screw conveyor 14. As shown more clearly in FIG. 3 of the drawings, the blades 15 of the conveyor are perforated for a purpose to be more fully described hereinafter. As can be seen more clearly in FIG. 3 of the drawings, one end of the screw conveyor 14 is journalled for rotation in a bearing 16 which extends through the end wall of the shell 11 and the standard 12. The opposite end of the screw conveyor is journalled for rotation in a bearing 17 which is suitably suspended within the shell 11 by means of a spider arrangement 18 which is suitably secured to the walls of the shell. In order to avoid the formation of rust on any of the aforementioned parts housed within the shell, the conveyor 14, blades 15, bearings 16, 17, and the spider arrangement 18 are all constructed of a non-corrosive metal such as stainless steel or like non-corrosive material.

A suitable motor 19, preferably mounted at the inlet end of the blancher and positioned under the shell 11, is coupled to a gear reducing unit 20 by means of a shaft coupling 21. A stub shaft 22 extends from the gear reducing unit and has mounted thereon a sprocket 23 over which extends a suitable flexible drive means 24 which is trained over sprocket 25 fixed to shaft 26 which is secured in any known manner to the aforesaid screw conveyor 14. Thus, it will be seen that when the motor 19 is activated, rotation of the screw conveyor within the shell 11 will be imparted through the aforesaid arrangement of parts.

As can be seen more clearly in FIG. 3 of the drawings, steam directing conduits 27, 28 are suitably secured to the outer walls of the shell 11. The steam conducting conduits 27, 28 preferably comprise a plurality of substantially U-shaped channel members with the area between the channels comprising short web portions shown generally at 50. The conduits 27, 28 are secured to the shell 11 as by welding or otherwise securing the web portions 50 to the shell 11 as clearly shown in FIG. 3 of the drawings.

The conduits 27, 28 are adapted to form passageways for the circulation of steam about the exterior of the shell 11. However, it is obvious that the conduits 27, 28 could be as effectively employed in directing other types of heating medium such as a heated liquid. The direct contact of the steam or other heating medium with the outside wall of the shell 11 will cause for a better heat transfer to the blanching liquid within the shell 11. As shown, a plurality of banks of steam conduits 27, 28 are mounted exteriorly of the shell in the manner aforesaid and each are individually fed with the heating medium from a suitable source of supply such as a boiler (not shown) to thus enable one to effectively zone control the temperature of the blanching liquid within the shell by regulating the amount of heating medium directed into the respective banks of steam conduits. The aforesaid banks of steam conduits 27, 28 extend throughout substantially the length of the shell 11 and terminate at a position on the shell where there is provided a hinged cover 29. This structure is shown more clearly in FIG. 2 of the drawings which shows the hinged cover 29 and the arrangement of the steam conduits 27, 28 extending to a position adjacent the hinge line 30 and the opposite or free end 31 of the aforesaid cover. Steam or other heating medium is admitted into the various banks of steam directing conduits 27, 28 through suitable admission ports 32. Suitable exit ports (not shown) for the heating medium are provided and are connected to said conduits in any well known manner.

The exit ports for the aforementioned heating medium are in turn connected to a suitable conduit means, not shown, which directs the heating medium to a heat producing unit such as a boiler where the same is reheated and subsequently redirected into the aforesaid conduits 27 and 28. With such an arrangement it can be appreciated that the heating medium will be constantly recirculated and a lesser amount of fuel need be employed for the reheating of the heating medium since the same will be at a relatively high temperature when it leaves the aforesaid exit ports 32. The recycling of the aforesaid heating medium will thus enable the apparatus to operate at a much lesser cost from the standpoint of fuel consumption than if the heating medium were not recycled in the manner aforesaid.

Access to the interior of the shell 11 is provided by means of the hinged cover 29 which is formed of a non-corrosive material and as shown in the modification of FIGS. 1 to 4, the same extends throughout the entire area of the shell to provide for the easy cleaning of the interior of the shell and parts therein as by directing a stream of a proper cleaning agent thereinto. Suitable drain openings 59 are provided in the bottom wall of the shell to permit for the exit of the cleaning composition employed in the cleaning operation.

As shown in FIG. 1 of the drawings, an inlet for the potatoes to be processed is provided at one end of the shell and a discharge mechanism is provided at the opposite end of the shell. The structure shown in FIGS. 1 to 4, inclusive, of the drawings includes an inclined screw conveyor 33 which is journalled for rotation in bearings 34, 35. A suitable motor 36 is mounted on a bracket of known type at one end of the conveyor and through a suitable flexible drive mechanism shown generally at 37, rotation of the screw conveyor 33 is imparted upon actuation of the aforesaid motor 36.

The conveyor 33 is housed within a substantially U-shaped housing 38 and as shown in the drawings, the blades or flights are perforated as shown at 39. A conically shaped hood 40 is welded or otherwise secured to the housing 38 and is provided at the upper portion thereof with a panel 41 secured thereto by a hinge 42. As can be appreciated, a fluid tight connection is made between the hood 40 and the U-shaped housing 38 and the shell 11 so as to prevent the leakage of any of the blanching liquid between these parts of the apparatus. Again, all of the parts employed in the discharge end of the apparatus such as the screw conveyor, the bearings therefor, the U-shaped housing, hood and hinged panel aforesaid are formed of a suitable non-corrosive material so as to obviate the formation of rust on any of these parts which would be deleterious to the liquid employed for the blanching operation.

To minimize the loss of heat of the heating medium directed into the conduits 27, 28, a suitable insulating material 43 is placed about the conduits and held thereon in any known manner. Insulation formed of magnesia has proven to be very effective in insulating the said conduits.

Shown at 44 is a suitable inlet for the blanching liquid which in most instances, comprises water. A suitable overflow is shown generally at 45 and is preferably located at the discharge end of the apparatus.

Thermal probes 46 and 47 are strategically located along the side walls of the shell 11 as shown in FIGS. 1, 2 and 4. The probes are of known construction and serve to give an indication of the degree temperature of the blanching liquid in the shell. Since a plurality of banks of conduits are employed for directing the flow of the heating medium therein, the temperature of the heating medium directed into one of the said banks may differ from the degree temperature of the heating medium directed into another set of banks to thus maintain the temperature of the blanching liquid at the desired temperature from entrance to the exit end of the blancher.

It is desirable that the blanching liquid be constantly recirculated within the shell 11 when the blancher is in operation. This can be easily accomplished by leading a conduit (not shown) from each of the aforesaid probes 46, 47 and connecting said conduits to a suitable header mechanism which in turn is connected to the suction side of any known type pump mechanism. The drawn off blanching liquid is then returned to the interior of the shell 11 through suitable ports (not shown) located along the sides of the aforesaid shell or to a single inlet means 44 formed therein. To prevent the entry of any of the materials undergoing processing within the blancher into the water outlets aforesaid, suitable perforations are provided in the wall of the shell where said probes 46, 47 are mounted. Thus, the blanching liquid can be withdrawn from within the shell by the pump means, aforesaid, and caused to recirculate within the shell. The perforations in the shell are kept free from clogging by reason of the scraping action of the screw 14 against the inner wall of the shell.

A suitable drain 60 is formed at the lower end of the U-shaped housing 38 so that when it becomes necessary to clean the interior of the housing and conveyor mounted therein, one need only to open the panel 41 by grasping the handle 48 and swinging the cover from its closed position to an open position shown in dotted lines in FIG. 4 of the drawings. Thus, as can be appreciated, the entire area of the discharge end of the blancher is made readily accessible for easy cleaning, a feature which is most desirable, particularly as expressed in the Code of Federal Regulations, aforesaid. For easy manipulation of the cover 29 and panel 41 from a closed to an open position, handles 48 may also be provided as shown in the drawings. In order to minimize the loss of heat from within the shell, a water filled channel 49 extends along the free end of the cover 29 and panel 41 as shown in FIG. 4 of the drawings.

Referring now to FIGS. 5 to 9, inclusive, of the drawings, there is shown therein a modified type of blanching apparatus. However, the structure shown in this modified type of apparatus is concerned more particularly with the type of discharge means employed for removing the processed materials from within the blanching apparatus. In this modification, the blancher is shown generally by the reference numeral 10'. A cylindrical shell 11' is supported on plate-like standards 12' which are spaced along the length of the shell as shown more clearly in FIGS. 5 and 7 of the drawings. As shown, the shell is supported in an elevated position with respect to a base 13' formed of any suitable framework. Mounted for rotation within the shell 11' is a screw conveyor 14' and the flights thereof are perforated as indicated at 15'. Suitable bearings 16', 17', are provided at both ends of the shell as shown more clearly in FIG. 7 of the drawings. A suitable motor 19' is connected to a gear reducing unit 20' by means of a shaft coupling 21'. A stub shaft 22' extends from the gear reducing unit and has fixed thereto a sprocket 23' over which is trained a flexible drive means 24' which extends over a sprocket 25' fixedly mounted on shaft 26' which is secured in any known manner to the screw conveyor 14' as shown more clearly in FIG. 7 of the drawings. As can be appreciated, rotation of the screw conveyor 14' is imparted upon actuation of the aforesaid motor 19' through the aforementioned gearing arrangement.

As previously described with respect to FIGS. 1 to 4, inclusive, the shell, screw conveyor and bearings shown in FIGS. 5 to 9 are formed of a non-corrosive material such as stainless steel or the like.

A plurality of banks of steam directing conduits 27', 28', comprise a plurality of substantially U-shaped channel members with web portions 50' extending therebetween. The banks of conduits are secured to the outside wall of the shell as by welding or otherwise securing the web portions thereto. While the conduits 27', 28', are described as steam directing conduits, it is obvious that the same may be employed for directing other types of a heating medium therein for heating the blanching liquid within the shell.

A plurality of covers 29' are provided for the shell 11'. These covers are hinged on hinge line 42' and suitable handles 48' are provided for easy manipulation of the covers from a closed to an open position. The covers are preferably made of an non-corrosive material so as to obviate the formation of rust thereon.

As shown, a suitable insulation 43' extends over the conduits 27', 28', and the heating medium for the conduits is admitted therein by means of admission ports 32' which are in communication with a suitable source of a heating medium, such as a boiler. Suitable exit ports (not shown) are provided for each of the banks of conduits for the return flow of the heating medium. As explained with reference to the modification shown in FIGS. 1 to 4, inclusive, of the drawings, the exit ports for the heating medium are in turn connected to a suitable conduit means, not shown, which direct the heating medium to a heat producing unit such as a boiler where the same is reheated and subsequently redirected into the aforesaid conduits 27' and 28' for the purposes set forth previously. As shown, a plurality of heat sensing probes 46', 47', are mounted along the shell 11' so as to enable one to determine the degree temperature of the blanching liquid therein and also to permit for the recirculation of the blanching liquid within the shell in the manner described previously with respect to the structure depicted in FIGS. 1 to 4, inclusive, of the drawings.

Blanching liquid is admitted into the shell 11' through a suitable inlet 44' and any excess liquid within the shell exits through a suitable overflow 45'.

The discharge end of the blancher comprises a generally U-shaped housing 51' which has a cover 57' which may be hinged thereon as shown at 55'. As shown more clearly in FIG. 9 of the drawings, the free edges of hinged cover 57' extend within a channel 49' which may be water filled to provide a seal between the housing and the cover. Similarly, a channel 49' extends along the free edges of the covers 29' and also may be water filled for a similar purpose.

Figure 9:
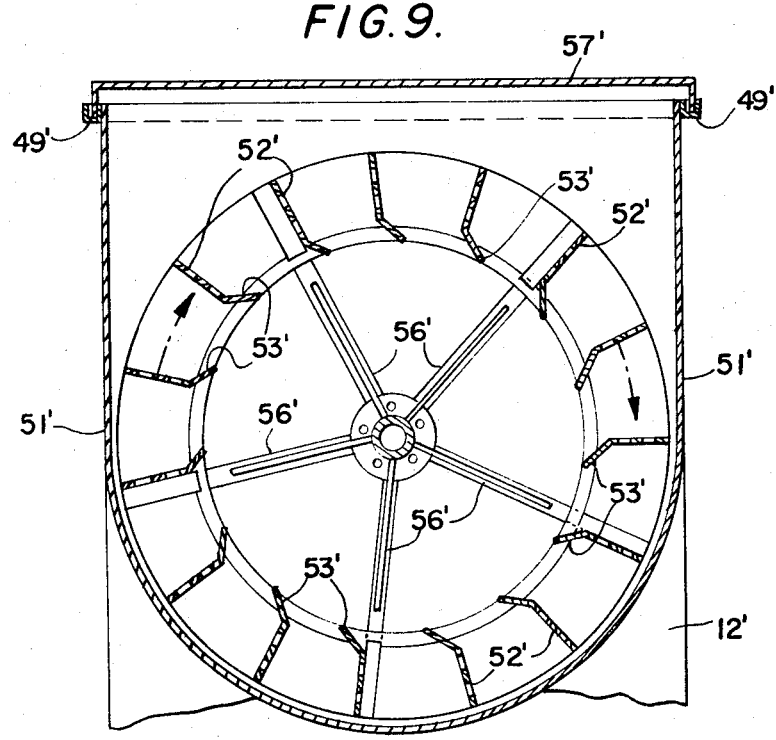
FIG. 9 is a section taken on line 9—9 of FIG. 5, looking in the direction of the arrows.

Mounted on a shaft which is secured for rotation with the screw conveyor is a wheel-type discharge mechanism which is shown more clearly in FIG. 9 of the drawings. The wheel is secured to the aforementioned shaft by means of a spider arrangement shown at 56'. As shown more clearly in FIG. 9 of the drawings, the discharge wheel comprises a number of plates 52' with the inner ends thereof bent as at 53'. The plates 52' are perforated as shown and in keeping with constructing a blancher adapted to operate under the most hygenic conditions, the wheel and its associated parts, as well as the U-shaped housing, is constructed of a non-corrosive material. A chute 54' leading exteriorly of the housing is provided to direct the processed material outwardly of the blancher to a suitable receiver station. A drain means is shown at 58' and like drain means are provided at the bottom of the shell so as to permit for the exit of any cleaning solution employed in the cleaning of the interior of the shell and also the discharge end of the blancher. Also, an access door 59' is provided at the discharge end of the blancher to facilitate the cleaning of the interior of the housing and wheel mounted therein.

The invention thus far has been described with respect to a blancher having but a single screw conveyor operating within a cylindrical shell. However, it should be pointed out that a similar apparatus could employe a pair or more screw conveyors arranged in a side by side arrangement to perform the same blanching operation. Also, while I have set forth that the parts coming in contact with the potato or other vegetable undergoing a blanching operation is made of a non-corrosive material, it is to be understood that such parts could operate as efficiently if they were lined with or suitably coated with a non-corrosive material.

The manner of operation of the aforesaid blancher is as follows:

A blanching liquid, usually water, is admitted into the shell so as to completely fill the same. Of course, this liquid will likewise extend into the discharge end of the blancher. Following the filling of the blancher with the liquid aforesaid, a heating medium such as steam or the like is admitted into the conduits mounted exteriorly of the shell of the apparatus to thus indirectly heat the blanching liquid. When the degree temperature of the liquid within the apparatus has reached the desired degree of heat to properly blanch the materials to be fed therein, such as potatoes, and the like, the blancher is then in a condition to process the same. The potatoes to be subjected to the blanching operation are fed into the interior of the shell through the inlet port provided at the entrance end of the blancher and with the screw conveyor within the shell rotating as the potatoes are being fed therein the same will be caused to travel from the entrance to the exit end of the blancher. During the travel of the potatoes from the entrance to the discharge end of the blancher the heated liquid therein will effect the proper blanching thereof. As can be appreciated, the speed of rotation of the screw conveyor employed in the discharge end of one modification of the invention will be so regulated as to effectively discharge the processed materials from within the blancher. In the case of the paddle wheel arrangement at the discharge end of the blancher, the same is so proportioned with respect to the shell as to effectively discharge the processed materials from within the blancher. The perforations formed in the screw conveyors as well as in the plates of the paddle wheel will be of such size as to permit for the passage therethrough of the blanching liquid only and to retain thereon the product undergoing the blanching operation. As can be appreciated, more heating medium must be directed into the conduits at the entrance of the blancher as the raw product entering the blancher, unless previously heated, will necessarily cool the blanching liquid at this portion of the blancher. However, the heat probes provided along the shell will enable one to determine the degree temperature of the liquid within the shell and may increase or decrease the amount of heating medium directed into the heating conduits so as to maintain the blanching liquid at the desired temperature.

As can be appreciated, following operation of the blancher for a period of time, the same should be thoroughly cleaned in order to insure for the continued operation of the blancher under a hygenic and sanitary condition. With all of the parts of the blancher which come in contact with the potatoes undergoing a blanching operation made of a non-corrosive material, there is no danger of the formation of rust on these parts which could have a deleterious effect on the blanching liquid. Also, since the blanching liquid is indirectly heated, in the manner described above, there is no danger of contamination of the blanching liquid if a live steam is introduced therein for heating the same as has been done in the past.

The provision of a plurality of access openings into the shell as well as in the discharge end of the blancher together with a plurality of drain areas in these portions of the mechanism lend the same to easy access to all of the internal parts of the blancher for the cleaning thereof from time to time to insure the continued operation thereof under sanitary conditions as specifically called for in the guidelines set forth in the aforesaid Code Regulations.

While I have described and shown a novel process and apparatus suitable for carrying out said process, it will be appreciated that various changes and modifications may be made therein, particularly in the form and relation of parts, without departing from the spirit of the invention as set forth in the appended claims.

I claim:

1. A blanching apparatus comprising a cylindrical shell, an inlet at one end of the shell for the introduction of materials into the said shell, a housing extending outwardly from connected to and in fluid-tight connection with, the shell at the opposite end thereof, for the discharge of materials from within the shell, a plurality of banks of fluid conducting coils mounted exteriorly and peripherally of the shell, said coils being in close adjacency and said coils also extending along the entire length of the shell, an insulation medium carried exteriorly by the said coils, and separate cover means carried by the shell and by the discharge housing for access to the spaces within the shell and the housing.

2. A blanching cpparatus as set forth in claim 1 wherein the discharge housing contains an inclined screw conveyor receiving the materials from the first mentioned screw conveyor and discharging them from said housing.

3. A blanching apparatus as set forth in claim 1 wherein the discharge housing contains a paddle wheel having perforated plates and rotatable in said housing to receive the materials from the first mentioned conveyor and advance them to a point of discharge.

* * * * *